3 Sheets—Sheet 1.

S. N. & E. A. ROBERTSON.
Apparatus for Catching Fish.

No. 202,962. Patented April 30, 1878.

Attest:
E. E. Baurl
August Petersohn

Inventor:
Samuel N. Robertson,
and Erwin A. Robertson
by C. A. Snow & Co.,
Attys

N. PETERS, PHOTO-LITHOGRAPHER, WASHINGTON, D. C.

3 Sheets—Sheet 2.

S. N. & E. A. ROBERTSON.
Apparatus for Catching Fish.

No. 202,962.      Patented April 30, 1878.

Attest:  
E. E. Court  
August Peterson

Inventor:  
Samuel N. Robertson & Erwin A. Robertson,  
C. A. Snow & Co.  
by  
Att'ys.

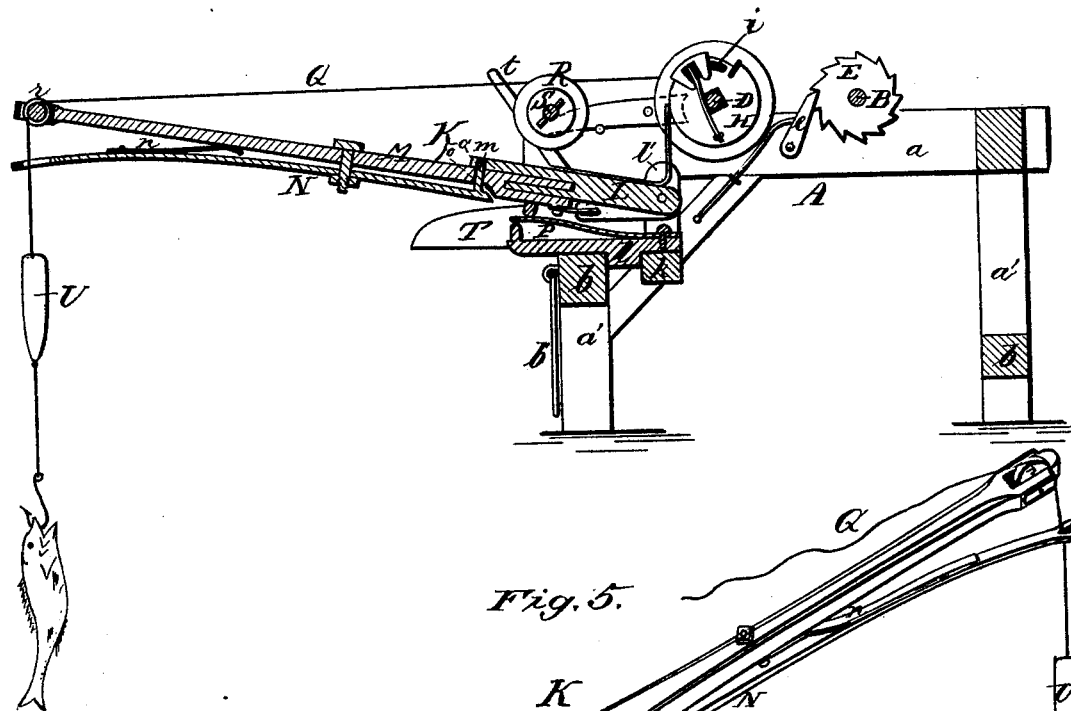
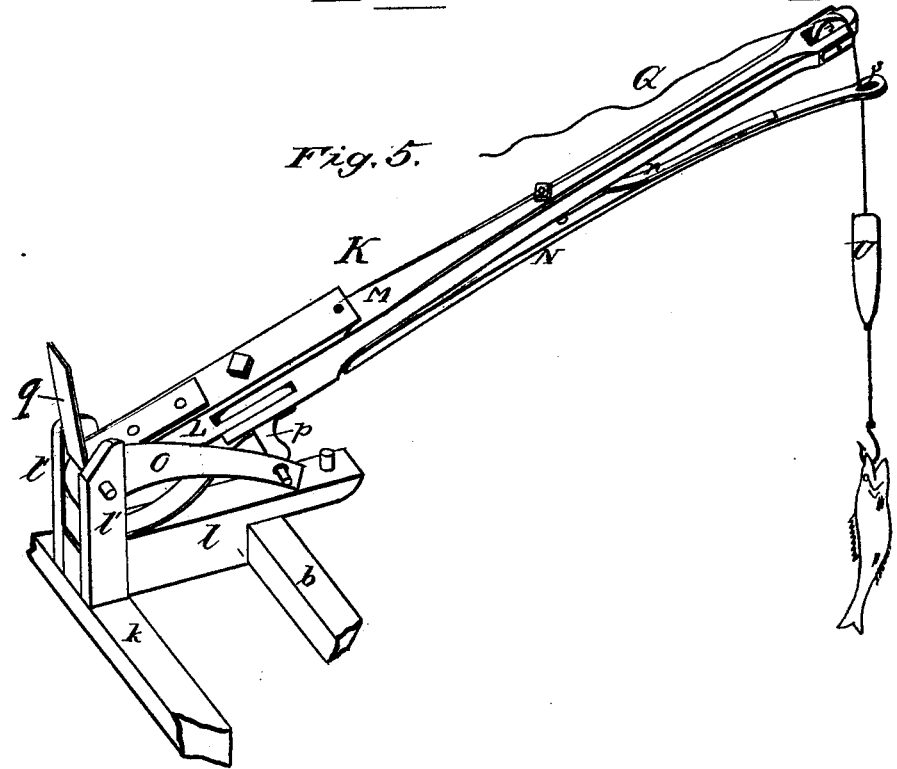

UNITED STATES PATENT OFFICE.

SAMUEL N. ROBERTSON AND ERVIN A. ROBERTSON, OF HAMPDEN, MAINE.

IMPROVEMENT IN APPARATUS FOR CATCHING FISH.

Specification forming part of Letters Patent No. 202,962, dated April 30, 1878; application filed August 9, 1877.

*To all whom it may concern:*

Be it known that we, SAMUEL N. ROBERTSON and ERVIN A. ROBERTSON, of Hampden, in the county of Penobscot and State of Maine, have invented certain new and useful Improvements in Apparatus for Catching Fish; and we do hereby declare that the following is a full, clear, and exact description thereof, which will enable others skilled in the art to which it appertains to make and use the same, reference being had to the accompanying drawings, which form a part of this specification, and in which—

Figure 1:
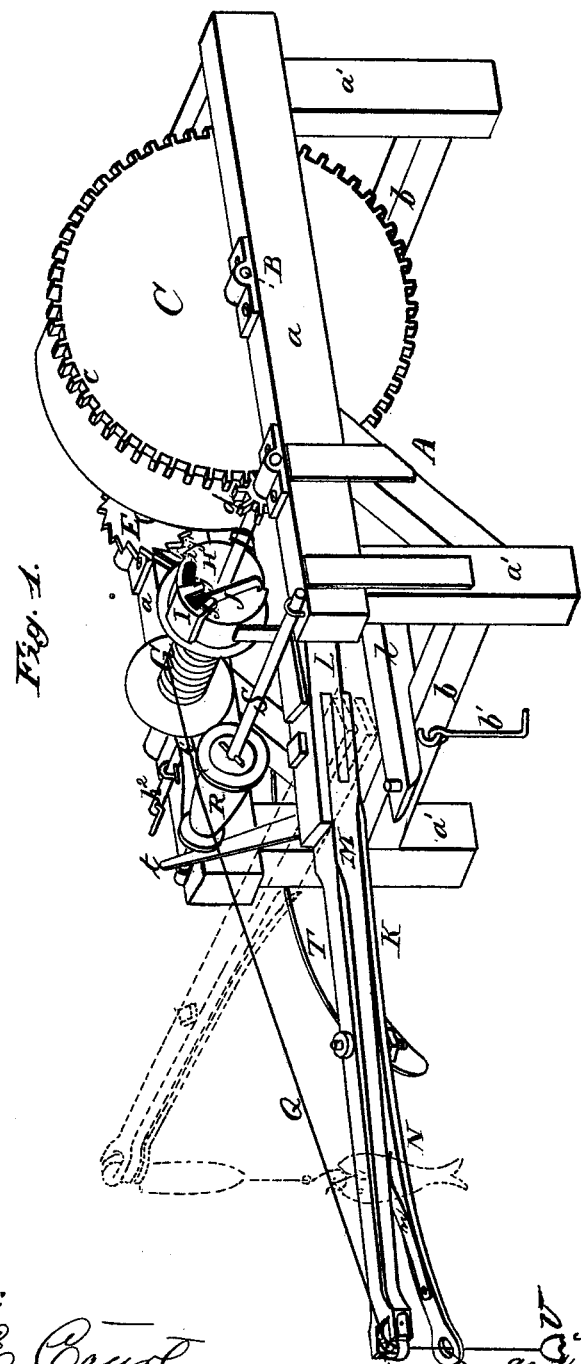
Figure 2:
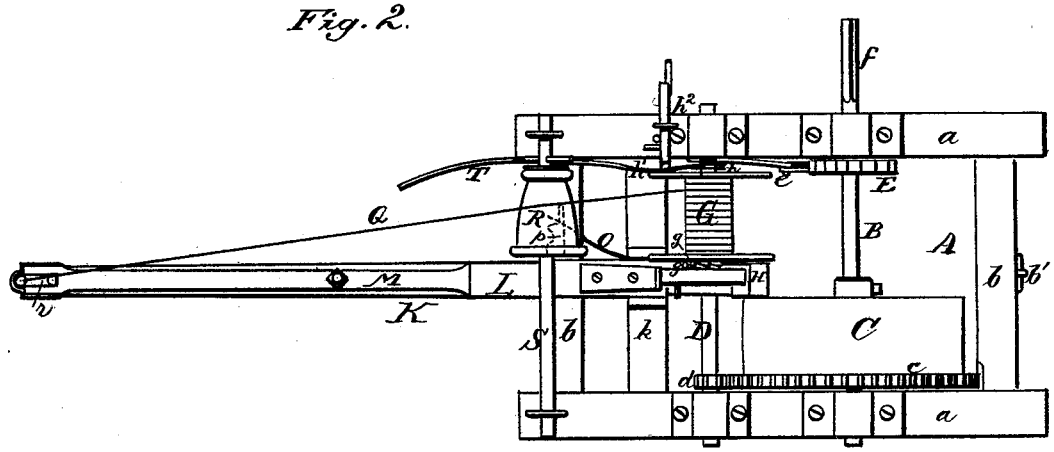
Figure 3:
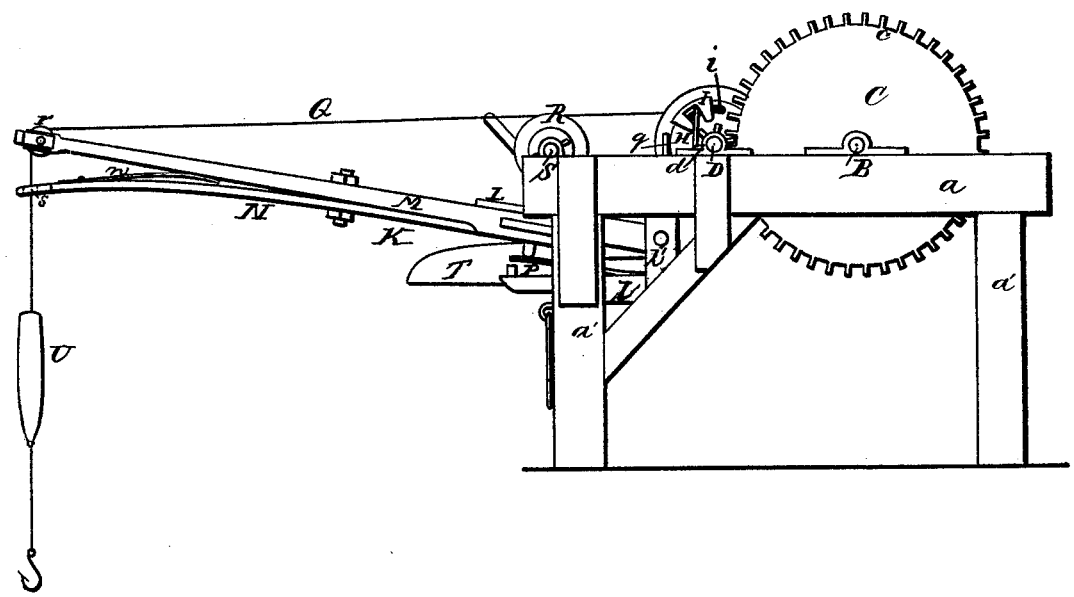

Figure 1 is a general perspective view. Fig. 2 is a top view. Fig. 3 is a side elevation. Fig. 4 is a longitudinal vertical section, and Fig. 5 shows the rod or sweep detached.

Similar letters of reference indicate corresponding parts in all the figures.

The nature of our invention consists in the construction of a machine or apparatus for catching fish by hook, said machine consisting, essentially, of a pivoted rod or sweep, a reel operated by spring-power, and a peculiarly-constructed stop-wheel, the line being carried from the reel over the sweep, which, when a bite is had, is instantly disengaged from the stop-wheel, thus causing the line to be wound upon the reel, and hauling the fish in.

The detailed construction of our apparatus is as follows: A is the table or frame of the machine. It consists of two side pieces or bars, $a$ $a$, having legs or supports $a'$ $a'$ and suitable braces or connecting-pieces $b$ $b$. It is also provided with hooks $b'$, or other devices, by which it may be attached to the side of a boat, or, if used on shore, to a suitably-arranged plank or platform.

B is the main shaft, which has its bearings in suitable boxes on top of and near the rear end of side pieces $a$ $a$. Upon shaft B is wound a stout coiled spring incased by a revolving box, C, the projecting edge of which, $c$, is toothed, so as to engage with a pinion, $d$, upon a shaft, D, in front of shaft B. The latter, B, is also provided with a solid ratchet-wheel, E, engaging with a spring-pawl, $e$, arranged upon the inside of one of the side pieces $a$, and its projecting end $f$ has a key or crank, by which it may be turned in order to wind the spring, the pawl and ratchet $e$ E serving to retain it when wound.

G is the reel, which is sleeved upon shaft D at one end thereof. It has at one end a clutch, $g$, by which it may be made to engage with the stop-wheel H, which has a similar clutch, $g'$. At the other end it has a grooved projection, $h$, engaging with a forked spring-lever, $h^1$, operated by a handle, $h^2$. By this mechanism the reel may be engaged or disengaged from the stop-wheel H when desired, in order to unwind the line.

The stop-wheel H consists of a disk of metal, keyed or otherwise secured upon shaft D. A short distance from its periphery, and concentric therewith, it has a slot, $i$, of a length equal to about one-fourth the periphery.

I is a slide fitted upon the periphery of disk H. It has downward-projecting arms $j$ $j$, provided with catches, by which it is attached to the disk, in the slot $i$ of which it slides. At one end of the slot $i$ disk H has a stud, $j'$, sloping down to the periphery. The slide I is forced in the opposite direction by a spring, J, arranged upon the side of the disk.

Under the shaft D, and in front thereof, the sides $a$ $a$ of the frame are united by cross-braces $k$, bridged to connecting-piece $b$ by a longitudinal reach, $l$, the rear end of which has two uprights, $l'$ $l'$, between which the compound rod K is pivoted. The construction of this will be readily understood by reference to Fig. 5 of the drawings, from which it will be seen that it consists of three principal parts—viz., the butt or body-piece L, which is pivoted to reach $l$, as described, the sweep M, which is hinged to the end of butt L in such a manner as to enable it to swing aside horizontally, and the trigger N, which is a lever pivoted under sweep M, and having its front end depressed by a spring, $n$, arranged between the two. At its rear end lever N has an upward-projecting stud, $m$, passing through perforations $o$ $o'$ in the sweep M and butt L, which are thus locked together. O is a strong spring arranged upon the side of butt L, and pressing upon an arm, $p$, extending laterally from sweep M behind the point at which it is hinged (or rather pivoted) to butt L. The effect of this spring, when butt L and sweep M are disengaged from each other, is to swing the latter aside to the position shown in dotted lines in Fig. 1.

P is a spring arranged upon reach *l* under the compound rod K, against the butt of which, L, it presses, so as to force it upward. On top of butt L, at the rear end thereof, is an upright, *q*, formed by a bent piece of steel bolted onto butt L, as shown. This upright engages with the slide I and stud $j'$ upon stop-wheel H, which, when thus engaged, is prevented from rotating. The end of sweep M has a guarded pulley, *r*, and the end of lever or trigger N has a perforation, *s*, over and through which the line Q is passed from reel G, it being first carried over a conical guide-pulley, R, sleeved upon a shaft, S, in front of shaft D. At the side of pulley R, upon side piece *a* of the frame, is placed a guard, *t*, to prevent the line from slipping off or becoming entangled while the device is in operation, and a curved guiding and supporting bracket, T, projects from one side of the frame, in front thereof, to support the sweep when swung aside.

The operation of our improved fish-catching apparatus is as follows: To set the machine, which is previously attached by the hooks $b'$ $b'$ to the side of a boat, or to a plank or platform suitably constructed if used on shore, the line Q is first unwound from the reel, which, to this end, is disengaged from the stop-wheel H, as described. In unwinding the line care must be taken not to depress the front end of compound rod K, as this would disengage the upright *q* at its rear end from the stop-wheel, which latter, presenting no resistance, would be rotated by the unspent force of the spring in box C to the injury of the machine. At the end of the line is a hook baited in the usual manner, and above this a small block of metal, U, which latter is firmly secured upon the line. After unwinding the line to any desired extent the reel G is recoupled to the stop-wheel, and the line is thrown out, and the spring is finally wound by the key or crank.

When a bite is had, the fish will, in diving or in trying to escape, exert a pressure through the line upon the end of compound rod K. This, being thus depressed, releases the upright *q* from the slide or stud upon the stop-wheel, when the spring in box C will, through the mechanism described, rotate shaft D with stop-wheel H and reel G, thus winding the line upon the latter slowly on account of the resistance of the fish until the resistance ceases, when the operation will instantly cease by the upright *q* re-engaging with stop-wheel H. If the fish has escaped, the machine is thus reset for operation without any further attention; but if he has not escaped, he will be played, precisely in the same manner as by hand with a fishing-rod, until drawn out of the water. The fish is now hoisted up until the metal block U strikes the end of lever or trigger N, thus releasing the butt L and sweep M from each other. The latter will then, impelled by spring O, be swung aside, thus bringing the fish within reach of the person, on the boat or on shore, who is manipulating the machine.

The advantages of our invention will readily appear from the foregoing description. A number of the machines—say from eight to twelve—may be attended to as easily as a single one. They require no attention beyond the setting, which can be performed easily and quickly. In drawing up the fish there will be no sudden jerk, but the operation will be performed smoothly and steadily, the fish being played as by hand until fairly caught, when, by the sudden motion of the sweep, it will be brought within reach of the operator, who may secure it.

Having thus described our invention, we claim and desire to secure by Letters Patent of the United States—

1. The combination of the spring-box C, having gear *c*, shaft D, having pinion *d* and stop-wheel H, and revolving reel G, having clutch *g*, by which it may be made to engage with stop-wheel H, substantially as and for the purpose herein shown and specified.

2. The stop-wheel H, having slide I and spring J, substantially as described, for the purpose herein set forth.

3. The combination of the compound rod K, having upright *q*, with the spring P, line Q, reel G, and stop-wheel H, all arranged and operating substantially in the manner and for the purpose shown and specified.

4. The compound rod K, consisting of butt L, horizontally-swinging sweep M, trigger N, and spring *n*, for operating the latter, the sweep M being provided with a pulley, *r*, at the end thereof, substantially as described, for the purpose herein set forth.

5. In combination with the compound rod K, reel G, and line Q, the conical guiding-pulley R and guard *t*, substantially as and for the purpose herein shown and specified.

6. The combination, with the swinging sweep M of compound rod K, of the spring O, arranged, as described, to force it aside when the trigger N is released, substantially as and for the purpose herein shown and specified.

7. The curved guiding and supporting bracket T, in combination with the sweep M and spring O, substantially as and for the purpose herein shown and specified.

8. The compound rod K, having swinging part M, spring O, lever-trigger N, having perforations *s*, and pulley *r*, in combination with the line Q, having solid metal block U, winding-reel G, and operating mechanism, as herein described, substantially as and for the purpose herein shown and specified.

9. The herein-described machine or apparatus for catching fish, consisting, essentially, of a stout operating-spring inclosed in case or box C, having gear-edge *c*, shaft D, having pinion *d*, stop-wheel H, and reel G, the latter arranged to engage, when desired, with stop-wheel H by clutch $g$, compound rod K, having upright $q$, springs P O, the latter operating the sweep M, trigger N, forming part of compound rod K, and line Q, having solid metal block U, all combined, arranged, and operating substantially in the manner and for the purpose herein shown and specified.

In testimony that we claim the foregoing as our own we have hereto affixed our signatures in presence of two witnesses.

SAMUEL N. ROBERTSON.
  ERVIN A. ROBERTSON.

Witnesses:
 J. WESTON HOPKINS,
 T. J. HOPKINS.